CARD CONTROLLED ELECTRICAL CIRCUIT SELECTING APPARATUS

Filed Sept. 25, 1957 5 Sheets-Sheet 1

Inventor
Allan D. Russell
by Roberts, Cushman & Grover
Att'ys

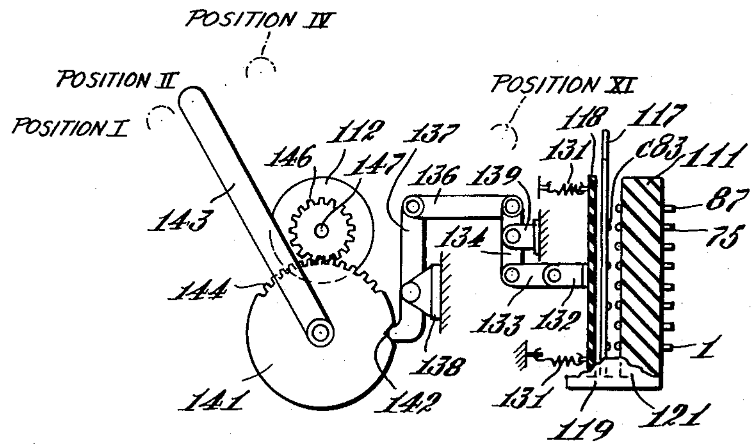
Fig. 5
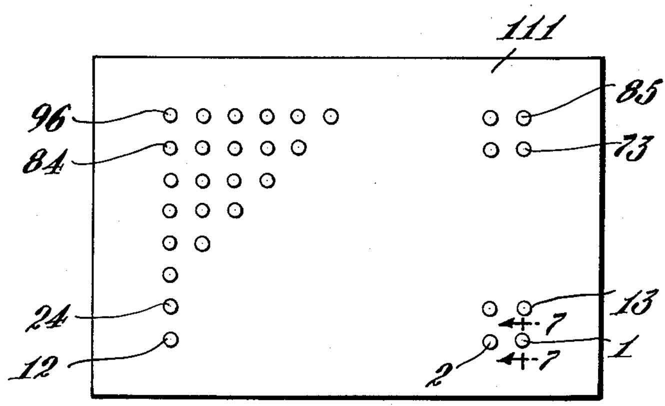
Fig. 6
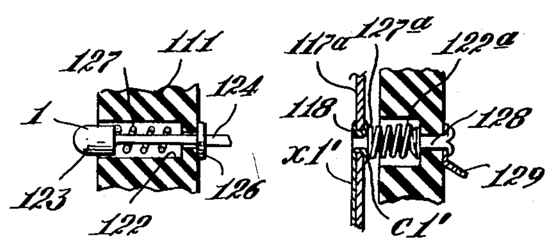
Fig. 7
Fig. 8
Inventor
Allan D. Russell
by Roberts, Cushman & Grover
Attys May 23, 1961 A. D. RUSSELL 2,985,819

CARD CONTROLLED ELECTRICAL CIRCUIT SELECTING APPARATUS

Filed Sept. 25, 1957 5 Sheets-Sheet 3

Inventor
Allan D. Russell
by Roberts, Cushman & Grover
Attys

Inventor
Allan D. Russell
by Roberts, Cushman & Grover
Attys

CARD CONTROLLED ELECTRICAL CIRCUIT SELECTING APPARATUS

Filed Sept. 25, 1957 5 Sheets-Sheet 5

Inventor
Allan D. Russell
by Roberts, Cushman & Grover
Attys

United States Patent Office 2,985,819

Patented May 23, 1961

2,985,819

CARD CONTROLLED ELECTRICAL CIRCUIT SELECTING APPARATUS

Allan D. Russell, 334 Winthrop St., Medford, Mass.

Filed Sept. 25, 1957, Ser. No. 686,177

5 Claims. (Cl. 324—24)

This invention relates to electrical apparatus wherein various combinations of circuits are selected under the control of a card. The invention is applicable to various types of electrical apparatus such as computers, coders and tube testers, wherein a plurality of voltage or signal terminals are to be connected in various combinations to utilization channels.

For example, apparatus for testing electronic tubes conventionally includes a multiterminal tube socket, and a source of test voltages to be applied through the socket to the tube. Depending on the test to be applied to the tube an appropriate voltage or voltages are applied to selected socket terminals, and good or bad characteristics of the tube in the socket are indicated by a meter, lamp or other indicator.

With several hundred types of tubes to be tested, and several tests to be applied to each tube, it is apparent that several thousand combinations of voltages must be available for selection. Hitherto the selection of the several electrode voltages for test of a particular tube has usually been made by use of a plurality of rotary switches. When the proper voltages are set up by rotary switching, additional switches are operated successively to apply the different tests. More recently punched cards have been used to select the voltages. The card perforations are sensed by brushes or fingers which in passing through a perforation make an electrical contact or cause a switching mechanism to operate.

While punched card controlled apparatus is an improvement over a manually set up tube tester, it is limited by the small inherent storage capacity of a punched card for storing combinations of connections, and the necessity for card controlled switching devices for selecting voltages.

Accordingly the principal objects of the invention are to provide card controlled apparatus wherein the card has a greatly increased storage capacity for a given card size, which apparatus eliminates the need for switching mechanism to select voltages, thereby greatly reducing the circuitry of the apparatus.

According to the invention electrical apparatus comprises a fixed insulating support carrying a plurality of contactors arranged in a predetermined pattern, an insulating card having a plurality of sets of contacts arranged on one side thereof in a pattern complementary to a part of said contactor pattern, electrical connections carried on said card between at least two sets of said contacts, and means for holding said card with its contacts engaged by said contactors, thereby electrically to connect said contactors through said contacts and connections in a plurality of different combinations.

For the purpose of illustration typical embodiments of the invention are shown in the accompanying drawings in which Fig. 1 is a diagrammatic view of tube testing apparatus;

Fig. 5 is a side elevation of the card support and selector switch mechanism of the apparatus;

Fig. 6 is a side elevation of a terminal board of the apparatus;

Fig. 7 is a section on line 7—7 of Fig. 6 showing a spring contact;

Fig. 8 is a section like Fig. 7 showing a modified spring contact;

Figure 1:
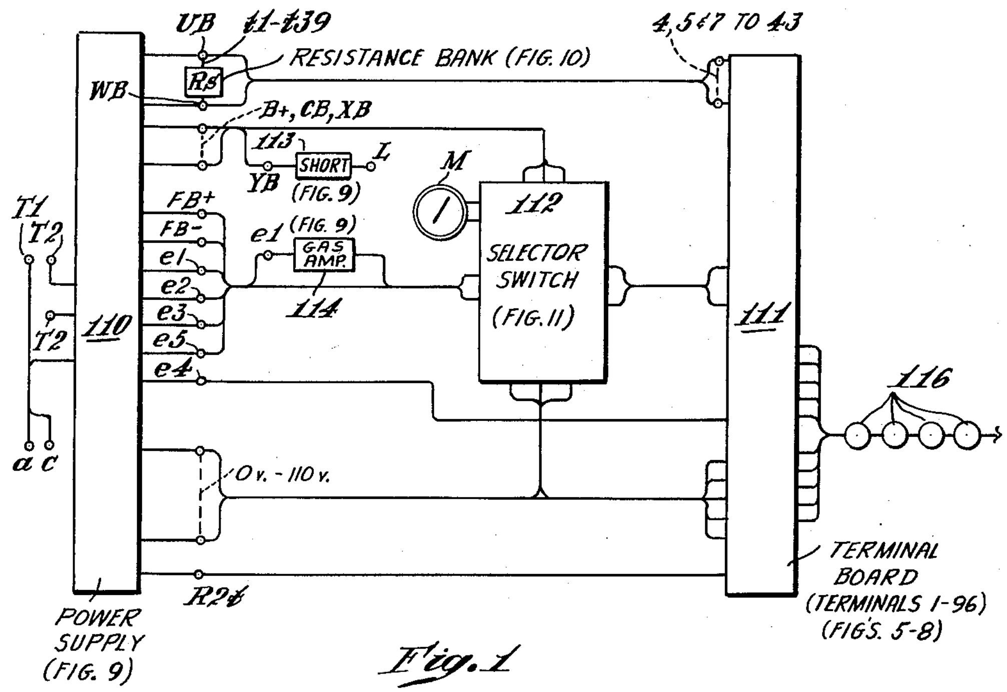
Figure 2:
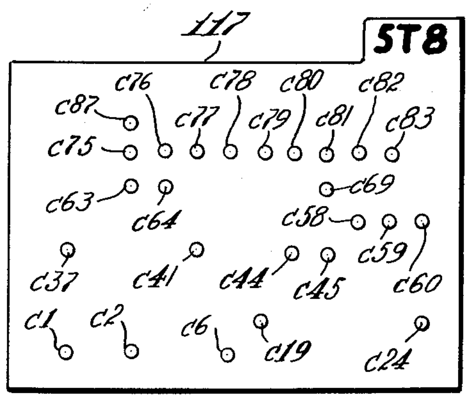
Figs. 2 and 3 are front and back side elevations of a control card.
Figure 10:
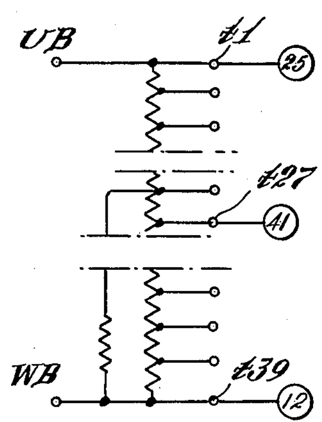
Fig. 10 is a schematic diagram of a resistor bank.

The general organization of the tube tester is shown diagrammatically in Fig. 1 in which a power supply 110 provides a number of voltages at terminals such as UB and R2*t*. The power supply output voltage terminals UB and WB are connected to a terminal board 111 having terminals 1 to 96 (Fig. 6). A resistance bank is connected across these terminals as is shown more fully in Fig. 10. Output voltage terminals B+, CB, and XB are connected to a selector switch 112 shown in detail in Fig. 11. An output voltage terminal YB is connected to a short circuit indicating network 113, having a terminal L. A set of output voltages FB+, FB—, and *e*1, *e*2, *e*3, and *e*5 are connected to the selector switch 112 directly, with the exception of terminal *e*1, which is connected through a gas amplifier 114 used to amplify current improperly carried by a defective tube having excessive gas within its envelope. An additional terminal *e*4 is connected directly to the terminal board 111. A group of output voltage terminals designated 0 v. to 110 v. are connected variously to the selector switch 112 and the terminal board 111.

Across A.C. terminals 6 v. and 0 v. is connected a dropping resistor and a potentiometer R2 in series with an indicator lamp L2. Prior to testing a tube the potentiometer R2 is adjusted so that its voltage at terminal R2*t* when applied through the selector switch and terminal board to the control grid of a triode, for example, will bias the triode to give a mutual conductance reading on the meter of Good or Bad.

The voltage output terminal R2*t* is connected to the terminal board 111. Also connected to the terminal board are a plurality of conventional tube and transistor sockets 116. An indicating meter M is connected to the selector switch 112.

Figure 3:
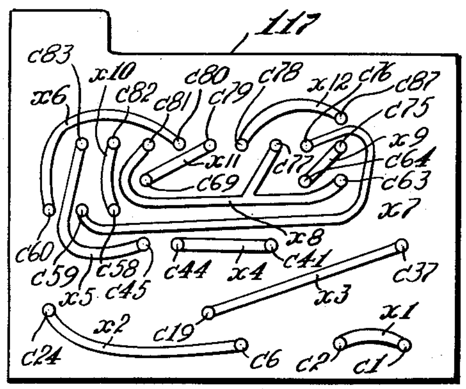

As shown in Fig. 5 the terminal board 111 serves partly as a support for a control card 117 shown in detail in Figs. 2 to 5. The control card 117 comprises a card of stiff, insulating material such as phenolic board in which are formed a plurality of openings 115. These openings match certain of the terminals 1 to 96 of the terminal board 111. Staked in each of the holes 115 are rivets *c*1, *c*2 and *c*60, for example. These contacts as well as the other numbered contacts in the series *c*1 to *c*96 on the card correspond in position to the like numbered contactors 1 to 96 on the terminal board. As shown in Fig. 3 certain sets of rivet contacts are electrically connected on the back of the card 117 by connectors in the form of printed silver coatings *x*1 to *x*12. For example, rivet contacts *c*1 and *c*2 are connected by a coating *x*1 of painted or deposited silver.

As shown in Fig. 8 an alternative form of contact and connection is formed by vapor coating of silver so that the silver not only forms the connection (*x*1') on the back side of the card 117*a* but extends through the openings 115 over the opposite edge to form a contact *c*1'.

As shown in Fig. 5 the card is adapted to be received in a support comprising the terminal board 111, a movable backing plate 118 of insulating material, a bottom wall 119 and side walls 121, all of which effectively form a slot receiving the card.

The terminal board 111 comprises a thick sheet of insulating material having a plurality of recesses 122 in which are mounted contactor pins 1 to 96. As shown in Fig. 7 the contactor pin comprises a head 123 adapted to slide in the slot 122 and a shank 124 which serves as a terminal and also carries a stop member 126 urged against the back side of the terminal board 117 by a spring 127.

Alternatively the contactor may comprise a simple helical spring 127*a* held by a rivet 128 in the recess 122, which recess is connected on the back side of the terminal board to a terminal 129.

Figure 4:
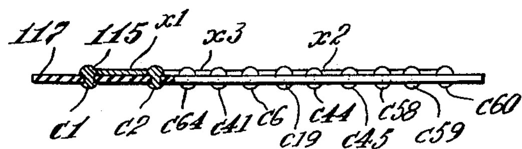
Fig. 4 is a top plan view of the card shown in Figs. 2 and 3; shown partly in section.

The contactor 1 of Fig. 7 is adapted for use with a card having rivet contacts *c*1 as shown in Fig. 4, while the spring contactor 122*a* of Fig. 8 is adapted for use with the plated contact *c*1' of Fig. 8.

The backing plate 118 of Fig. 5 is normally held away from the control card 117 by springs 131. The backing plate is connected through a linkage comprising stud 132, links 133, 134, 136, and 137 to a cam 141. Links 134 and 137 are pivoted to a frame by studs 134 and 138. The cam 141 which is actuated by a lever 143 has a recess 142, into which the nose of the link 137 drops when the lever 143 is in the black line position II shown in Fig. 5. The lever 143 may be moved counterclockwise to a position I or clockwise through a series of positions III to X to a position XI as shown in broken lines. In any of the positions except II the link 137 is cammed out of the opening 142 thereby pressing the backing plate 118 through the linkage 132 to 137 against the control card 117 firmly urging the card contacts against the corresponding contactor pins. When the lever is in position II the backing plate 118 is retracted to facilitate easy insertion of the card 118 in the support and to prevent undue abrasion of the contacts *c*1 to *c*96 against the contactors. While for clarity the backing plate 118 is shown in a retracted position spaced from the card 117, in practice it is desirable to hold the card 117 in light contact with the terminals 1 to 96 during insertion and removal of the card in order to obtain a wiping action which cleans the contacts and the contactors. The card 117 serves to interconnect appropriate voltages of the power supply with the terminals of the sockets 116 and the indicator used in the tube tests. The terminals of the sockets 116 and of the indicators may be called utilization terminals.

The cam 141 carries gear teeth 144 meshing with teeth 146 on a gear attached to the shaft 147 of the selector switch 112. As will be described more fully the selector switch in any of the positions I and III to XI connects certain of the terminals 1 to 96 of the terminal board 11 to the circuits which have been selected by the card 117.

Figure 9:
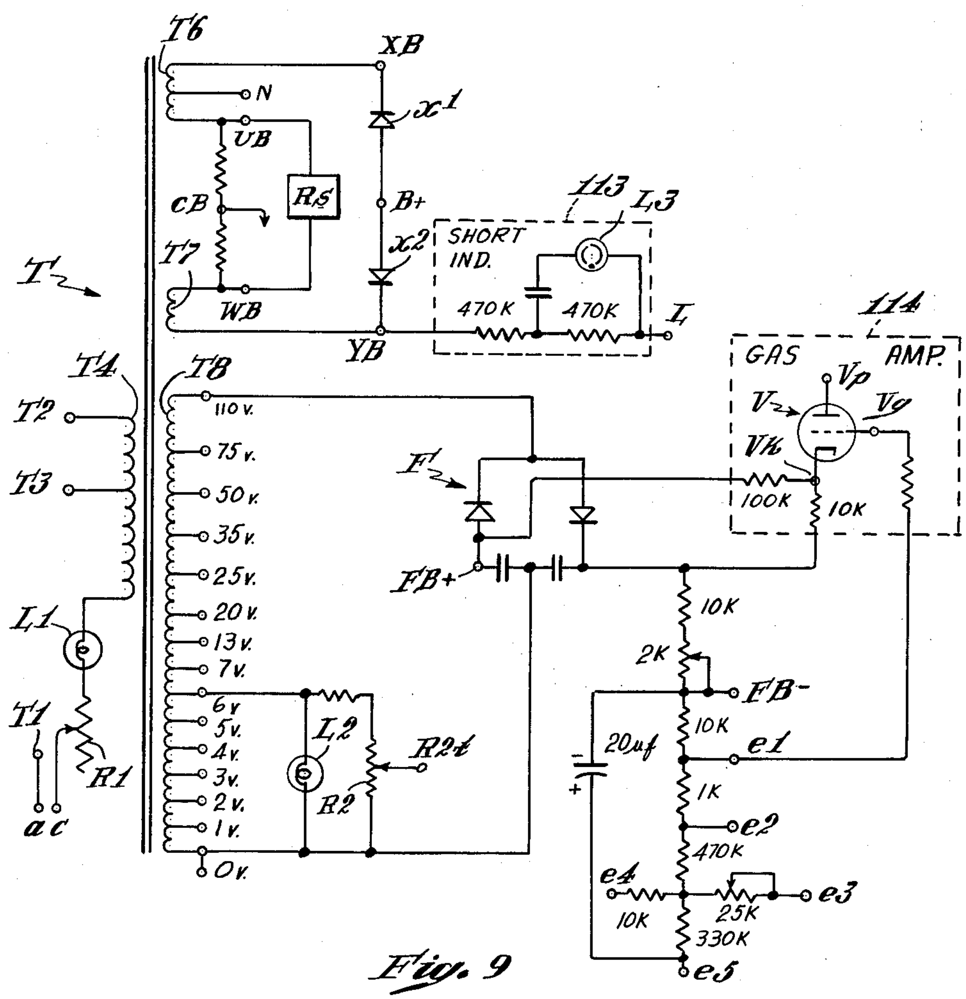
Fig. 9 is a schematic diagram of the power supply for the apparatus.

The power supply 110, shown in detail in Fig. 9, comprises a power transformer T having a primary winding T4 and secondary windings T6, T7 and T8. External power is supplied to the primary through terminals *a* and *c*, of which terminal *c* is connected through a potentiometer R1 and indicator lamp L1 to the primary winding T4. The other power terminal *a* is connected to a terminal T1 adapted to be connected by the control current 117 to either of terminals T2 or T3. The secondary windings T6 and T7 supply alternating current respectively of 190 volts to terminals UB and WB, 175 volts to terminals XB and YB and 35 volts to terminal N. Terminal CB serves as a floating ground or cathode bus. Rectifiers X1 and X2 supply an unfiltered or pulsating direct current of about 190 volts to terminal B+. A resistor bank R*s* is connected across terminals UB and WB as shown more fully in Fig. 10. Terminal YB is connected through two dropping resistors to a terminal L. Across the second dropping resistor is a blocking capacitor and a neon indicator lamp L3. The network within the broken line blocks 113 comprises a circuit indicator whereby when two electrodes of a tube are connected in series to terminal L, and those electrodes are defective in that a short circuit exists between them, an A.C., voltage will appear across the lamp L3 causing the lamp to glow and indicate the short circuit.

Figure 11:
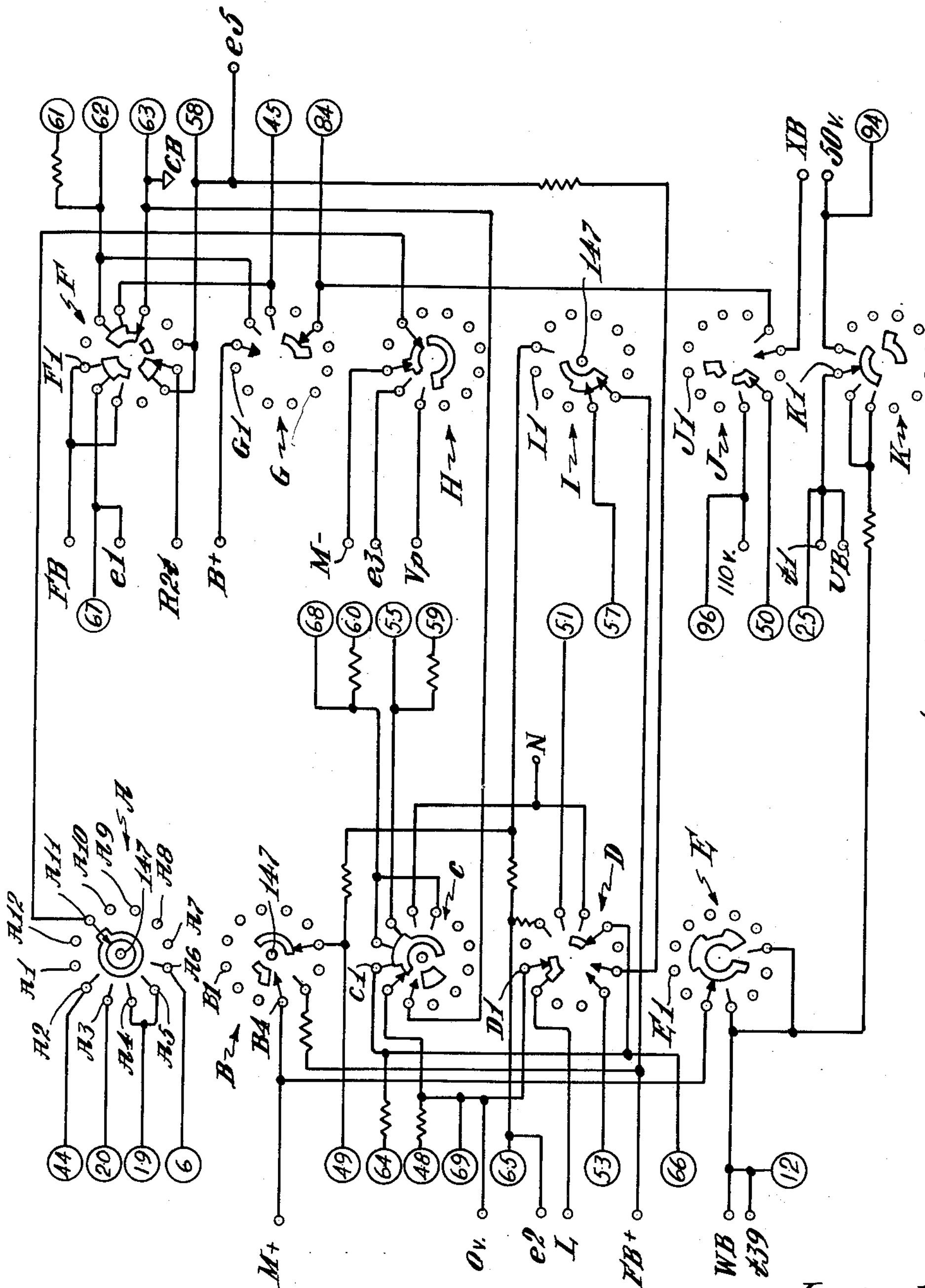
Fig. 11 is a schematic diagram of the selector switch showing the connections thereto.

The secondary winding T8 of the power transformer has a plurality of taps 0 v. to 110 v. at which the corresponding A.C. voltages appear. Terminal 0 v. is connected to terminal 69 of the terminal board. Terminal 1 v. is connected to terminal 73, and terminals 2 v. to 110 v. are connected to terminals 85 to 96 respectively. As shown in Fig. 11 terminals 0 v., 50 v. and 110 v. are connected to the selector switch.

A rectifying and filtering network F connected across the terminals 0 v. and 110 v. supplies a rectified and filtered B+ voltage at about 180 volts at terminal FB+, and a filtered B− voltage at terminal FB−. Through a voltage divider network of resistances whose values are marked in ohms, negative bias voltages are supplied to terminals *e*1 to *e*5. Terminals *e*1, *e*2, *e*3 and *e*5 are connected to the selector switch as shown in Fig. 11. Terminal *e*4 is connected to terminal 54 of the terminal board 111.

An amplifying tube V, which may be type 1S5 has its grid V*g* connected to terminal *e*1 and its cathode V*k* connected to the A.C. terminal 0 v. When the plate terminal V*p* is connected through the selector switch, terminal board and card in series with the plate and cathode of the tube under test and the meter M, the circuit 114 within the broken line block serves as an amplifier for small currents improperly conducted by a gassy tube and for this reason is called a gas amplifier.

The resistance bank R*s* connected across the terminals UB and WB comprises a plurality of resistors having a value in the order of 20 ohms whose junctions are connected to the voltage terminals *t*1 to *t*39. A parallel 47 ohm resistor is connected between terminal *t*39 and one of the intermediate terminals. Terminal *t*1 is connected to terminal board terminal 25 and terminal *t*39 is connected to terminal 12. The intermediate thirty-seven terminals are connected to various of the terminal board terminals of which examples will subsequently be given sufficiently to illustrate the use of the terminal resistor bank.

In Fig. 11 is shown schematically the selector switch 112 and its interconnection with the various component parts of the apparatus previously described. The selector switch comprises 11 sections designated A to K, each of which comprises a wafer switch element having one or more parts. Each switch section, for example section A, has 12 terminals numbered A1 to A12. Certain of these terminals are not used, others have a short contactor indicated by a radial line, and others have a long contactor indicated by an arrow head. In each case the switch wafer elements have portions extending radially from the switch shaft 147 to a point where the longer contactor designated by an arrow can contact them, and other portions extending further radially to a point where the shorter contactors can contact them. Such a switch is conventional and no further explanation is believed necessary for the description of the present invention. Fig. 11 shows the connection between the terminals of each switch section and the terminals of the terminal board. For example, board terminals 44, 20, 19 and 6 are connected respectively to the switch terminals A2, A3, A4, and A6 of section A. As a further example B4 and H1 are connected respectively to the meter terminals M+ and M−.

As shown in Fig. 11 the selector switch is in the first position I wherein sections A, B, E, J, and K are ineffective, since no connection is made between the terminals of these sections.

Figure 12:
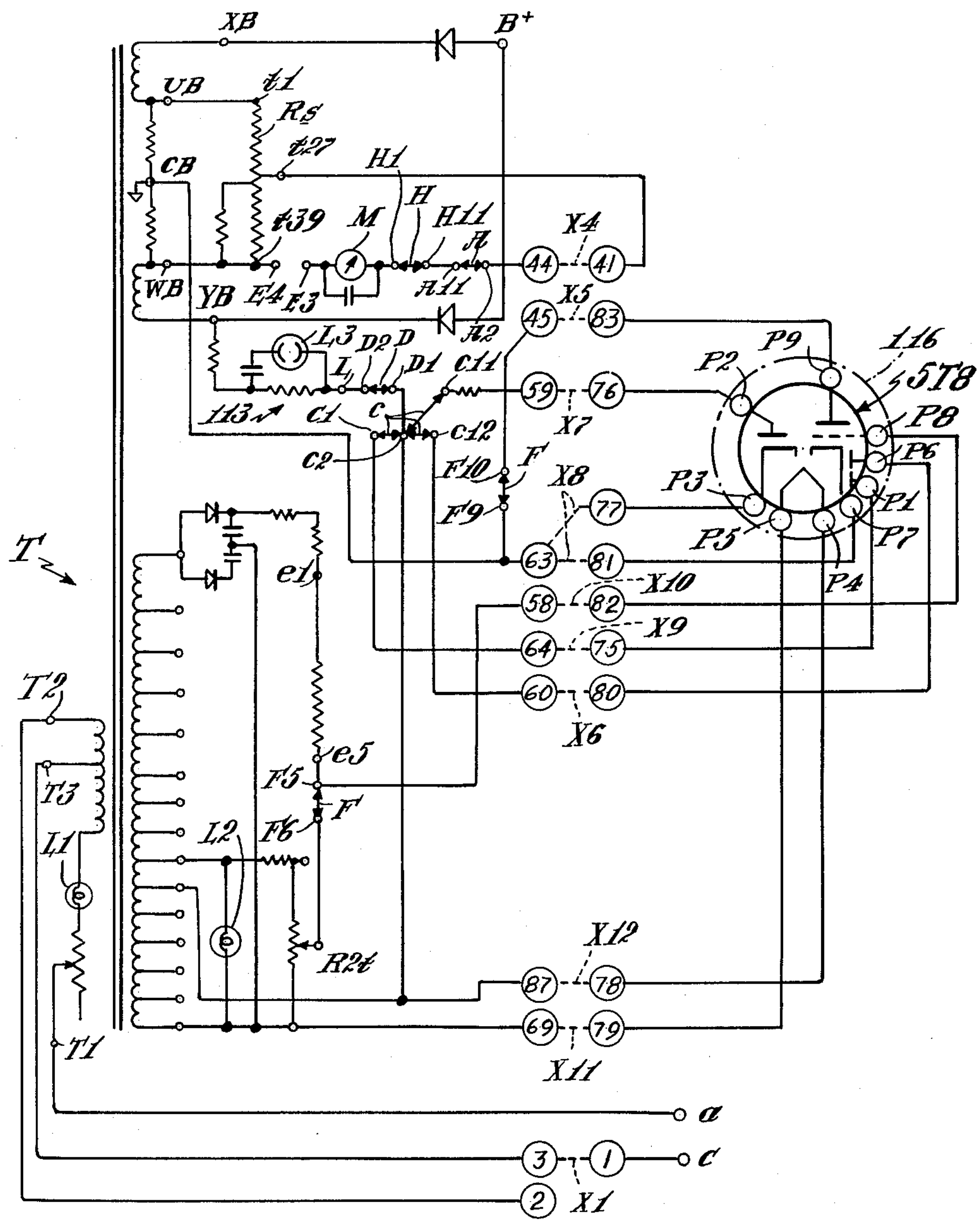
Fig. 12 is a schematic diagram of that portion of the circuit shown in Figs. 9 to 11 used in making a particular tube test.

Figs. 11 and 12, show in other sections the actual circuit connections for position I, the Short Test position of the selector switch 112.

Position II, the Off position will first be briefly described. Position II may be visualized as one counterclockwise step from position I. In this position the significant connections made by the card 117 are as follows. Contacts *c*1 and *c*3 complete a connection *x*1 through the corresponding terminal board contactors 1 and 3 between one side of the A.C. line and the transformer T. Contacts *c*69 and *c*79 make a connection *x*11 from one 5T8 tube filament terminal P5 and the 0 v. terminal of the power supply. Contacts *c*87 and *c*78 make a connection *x*12 between the other filament terminal P4 and the 5 v. supply terminal. A.C. power is thus supplied to the power transformer T, and the filaments are heated, connections to other electrodes of the 5T8 tube are not significant in position I.

For the illustrated position I, the significant card connections are as follows. The 5T8 triode plate P9 is connected through contact *c*83, the printed connection *x*5 and contact to switch section F, which for this test position connects to the cathode bus CB. Similarly, card contacts *c*81 and *c*77 and *c*63 and connection *x*8 connect the cathodes P3 and P7 to the cathode bus, thereby effectively grounding the triode plate and cathodes with respect to the A.C. voltage terminal YB. Card connections *c*59—*x*7—*c*76, *c*64—*x*9—*c*75, and *c*60—*x*6—*c*80 respectively connect the diode plates P2, P1 and P6 to selector switch section C, wherefrom they are connected through sections C and D to terminal L. Terminal L is connected through the indicator lamp circuit 113 to supply terminal YB which carries approximately 200 volts with respect to the cathode bus CB. A short circuit between any of the triode plates P9 or the cathodes P3, P7 and any of the diode plates P1, P2 or P7 draws current through the lamp L3 causing it to glow and indicate a short. Thus the card connections *x*5 to *x*9 are effective in the short test.

In other positions of the selector switch these and other connections are effective for the purpose of testing the conductance of the triode and diodes. The various tests are well known, and, once given the novel card connections of the present invention, the selector switch connections will be apparent to one skilled in the art. However, one further test will be described.

For position IV of the selector switch 112, in the case of a 5T8 tube, the following card connections are significant. Card connections *x*1, *x*11 and *x*12, previously described with relation to position II, respectively energizes the primary of transformer T(*x*1), and supply 5 v. filament voltage to tube (*x*11 and *x*12). Card connections *c*41—*x*4—*c*41 connects top *t*27 of the resistor bank R*s* to board terminal 44. The selector switch in position IV through terminals A2, A11, H11, H1, E3 and E4 connects the meter M between *t*1 and 44, hence the meter is connected across a resistance *t*1 to *t*27 of approximately 460 ohms. Thus the card selects a parallel resistance for the meter M. Card connections *c*83—*x*5—*c*45 connects the triode plate P9, through switch terminals G9 and G12, B+ terminal of the power supply. Card connections *c*81—*x*8—*c*63 connect the triode cathode P7 directly to the cathode bus CB. The current drawn by the triode from the cathode bus CB through the plate supply terminal B+ of the power supply will produce a proportional IR drop across the resistor bank R*s*. The portion of this IR drop selected by the card contacts *c*44 and *c*41 will in turn appear across the meter M.

The current appropriate to the test is determined by card contacts *c*82—*x*10—*c*58, which connect the triode grid P8 to voltage terminal *e*5, thereby biasing the triode with the voltage appropriate to 5T8 tube rating and the meter shunt resistance selected. If, under these conditions the current conducted by the tube is substandard the meter will so indicate.

Similar control cards may be used for establishing the various test conditions for virtually all of the common radio tubes. For example a simple triode might have the same pin connections P4, P5, P7, P8 and P9 as the illustrated 5T8 tube, but would be designed for operation under different voltages. In such a case the tube socket would be connected to board contactors 79, 78, 81, 82 and 83 respectively as with the 5T8. However, the corresponding card contacts *c*79, *c*78, *c*81, *c*82 and *c*83 would not be connected to the same card contacts as in the 5T8 card. For example, if a 12 volt filament supply were specified, the card connection *x*1 would extend from contact *c*78 to contact *c*88 rather than *c*89, board contactor 88 being connected to voltage terminal 13 v.

Thus the control card 117 sets up the proper preparatory connections for a plurality of tests, requiring only one switch actuation to select the connections set up. The card eliminates all preliminary switching common to previous testers, and because of the extensive number of connection combinations available, the factorial of the number of contacts, the apparatus easily affords many tests on a great number of types of tubes, being limited practically only by the number of types of sockets 116 installed in the instrument.

While a tube tester has been given as an example of how connections to voltage or signal sources may be selected with a simple terminal board and control card, it is evident that the novel combination of card and board may be advantageously used in other apparatus. For example, where it is desired to route the various timing, control, digital and like input signals to computer memories and operational circuits, cards may be prepared for the various combinations of input signals and routes. In computers as well as tube testers and other equipment involving coding, the wiring of the equipment is greatly simplified by virtue of the ability of the card to store great varieties of information and assume the burden of making many of the internal connections and switching actions.

Thus the present disclosure is for the purpose of illustration only, and the invention includes all modifications and equivalents which fall within the scope of the appended claims.

I claim:

1. Electrical apparatus comprising a fixed insulating support carrying a plurality of contactors arranged in a predetermined pattern, an insulating card having a plurality of sets of contacts arranged on one side thereof in a pattern complementary to a part of said contactor pattern, electrical connections carried on said card between at least two sets of said contacts, means for holding said card with its contacts engaged by said contactors, thereby electrically to connect said contactors through said contacts and connections in a plurality of different combinations, a plurality of utilization terminals, and switch means connected to said contactors and utilization terminals, said switch means having different positions in which different combinations of said contactors may be connected to said utilization terminals.

2. Electrical apparatus comprising a fixed insulating support carrying a plurality of contactors arranged in a predetermined pattern, an insulating card having a plurality of sets of contacts arranged thereon in a pattern complementary to a part of said contactor pattern, electrical connections carried on said card between at least two sets of said contacts, movable means for pressing said card against said support with its contacts engaged by said contactors, thereby electrically to connect said contactors through said contacts and connections in a plurality of different combinations, switch means connected to said contactors for selecting at least one of said combinations of contactors connected by said card, and a single actuator for said movable means and switch means.

3. Electrical apparatus comprising a fixed insulating support carrying a plurality of contactors arranged in a predetermined pattern, an insulating card having a plurality of sets of contacts arranged therein in a pattern complementary to a part of said contactor pattern, electrical connections carried on said card between at least two sets of said contacts, movable means for pressing said card against said support with its contacts engaged by said contactors, thereby electrically to connect said contactors through said contacts and connections in a plurality of different combinations, a rotary switch connected to said contactors for selecting at least one of said contactors connected by said card, and a single cam actuator for moving said movable means and rotating said switch.

4. Electrical apparatus comprising an electrical power source having a plurality of voltage output terminals, a plurality of voltage utilization terminals, a fixed insulating support carrying a plurality of contacts arranged in a predetermined pattern and connected to said output and utilization terminals, an insulating card having a plurality of sets of contacts arranged thereon in a pattern complementary to a part of said contactor pattern, electrical connections carried on said card between at least two sets of said contacts, means for holding said card with its contacts engaged by said contactors, thereby electrically to connect said contactors through said contacts and connections in a plurality of different combinations, and switch means connected to said contactors and utilization terminals, said switch means having different positions in which different combinations of said contactors may be connected to said utilization terminals.

5. Electronic tube testing apparatus comprising a tube socket having a plurality of terminals, an insulating terminal board having a plurality of contactors arranged in a predetermined pattern, connections between certain of said contactors and said socket terminals, an electrical power supply including a transformer with primary input terminals and a secondary connected through a distribution network to a plurality of voltage output terminals adapted to be connected to said socket terminals, means connecting said output terminals with others of said contactors including a rotary switch having a plurality of positions for successively selecting certain of said output terminals, an electric indicator connected to said switch for exhibiting a performance characteristic of a tube in said socket, an insulating card having a plurality of sets of contacts arranged thereon in a pattern complementary to a part of said predetermined contactor pattern, electrical connections on said card appropriate to the tube in said socket between at least each set of contacts and said socket, primary voltage output terminals and terminal board respectively, movable guide means for receiving said card and urging it against said board with its contacts engaged by said contactors thereby electrically to connect said contactors through said contacts and card connections in a plurality of different combinations, a single cam actuator for moving said switch through said positions and operating said movable means, said cam having one position in which it retracts said movable means to facilitate guiding of the card into complementary relation to said board, the card connection to said primary and therefore the supply of output voltage to said socket being made only when said card is in complementary relation, so that said card cannot cause connection of an inappropriate voltage to said socket prior to being fully received in said relation.

References Cited in the file of this patent

UNITED STATES PATENTS

| | | |
|---|---|---|
| 2,198,503 | Morrison | Apr. 23, 1940 |
| 2,870,400 | Hickok | Jan. 20, 1959 |

FOREIGN PATENTS

| | | |
|---|---|---|
| 424,714 | Italy | Aug. 28, 1947 |

OTHER REFERENCES

Article: Punched-Card Tube Tester, Electronic Design, June 1955, vol. 3, No. 6, pp. 46–47.